United States Patent
Johansson et al.

(10) Patent No.: US 9,819,700 B2
(45) Date of Patent: Nov. 14, 2017

(54) SYSTEM AND METHOD FOR PASSIVE COMMUNICATION SERVICES

(75) Inventors: Jonas Johansson, Saint-Laurent (CA); Zhongwen Zhu, Saint-Laurent (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1325 days.

(21) Appl. No.: 13/213,531

(22) Filed: Aug. 19, 2011

(65) Prior Publication Data

US 2012/0311049 A1 Dec. 6, 2012

Related U.S. Application Data

(60) Provisional application No. 61/491,296, filed on May 30, 2011.

(51) Int. Cl.
| | |
|---|---|
| G06F 15/16 | (2006.01) |
| H04L 29/06 | (2006.01) |
| H04L 29/08 | (2006.01) |
| H04L 12/58 | (2006.01) |

(52) U.S. Cl.
CPC ........ H04L 65/1016 (2013.01); H04L 51/043 (2013.01); H04L 67/24 (2013.01); *H04L 51/046* (2013.01); *H04L 51/38* (2013.01)

(58) Field of Classification Search
USPC .................. 709/227, 206; 719/313; 455/466
See application file for complete search history.

(56) References Cited

U.S. PATENT DOCUMENTS

| | | |
|---|---|---|
| 7,409,427 B2 | 8/2008 | Fry |
| 7,546,133 B2 | 6/2009 | Harris et al. |
| 2003/0114174 A1 | 6/2003 | Walsh et al. |
| 2004/0037396 A1 | 2/2004 | Gray et al. |
| 2005/0102389 A1 | 5/2005 | Liscano et al. |
| 2006/0155814 A1* | 7/2006 | Bennett et al. ............... 709/207 |
| 2006/0190117 A1 | 8/2006 | Weczorek et al. |
| 2009/0054092 A1* | 2/2009 | Stonefield .......... G06Q 30/0601 455/466 |

(Continued)

FOREIGN PATENT DOCUMENTS

| | | |
|---|---|---|
| CN | 101299785 A | 11/2008 |
| JP | 2007020231 A | 1/2007 |

(Continued)

OTHER PUBLICATIONS

International Search Report for PCT/IB2012/052684 dated Aug. 29, 2012; 4 pages.

*Primary Examiner* — Aftab N. Khan
*Assistant Examiner* — Tsung Wu
(74) *Attorney, Agent, or Firm* — Ericsson Canada Inc.; David J. Rahmer (57) ABSTRACT

Passive presence information for a first user of a service, such as a conversation service, is obtained by analyzing user activity logs. This is performed upon request for a second user. Thus lightweight presence information can be obtained without requiring the higher overhead required in a conventional Internet Protocol Multimedia Service (IMS) environment. Such a lightweight presence feature can enable other services including a conversation service that allows users to update a conversation object. Users can listen for updates to particular conversation objects, thus providing a simulated real-time push experience.

19 Claims, 7 Drawing Sheets

(56) References Cited

U.S. PATENT DOCUMENTS

| | | | |
|---|---|---|---|
| 2009/0150400 A1* | 6/2009 | Abu-Hakima et al. | 707/10 |
| 2009/0287920 A1* | 11/2009 | Fernandez et al. | 713/151 |
| 2010/0107088 A1 | 4/2010 | Hunt et al. | |
| 2010/0146057 A1* | 6/2010 | Abu-Hakima et al. | 709/206 |
| 2010/0323752 A1 | 12/2010 | Park et al. | |
| 2011/0019662 A1* | 1/2011 | Katis | H04L 12/1831 370/352 |

FOREIGN PATENT DOCUMENTS

| | | |
|---|---|---|
| JP | 2009010732 A | 1/2009 |
| JP | 2011091589 A | 5/2011 |
| WO | 2008/060085 A1 | 5/2008 |

\* cited by examiner

SYSTEM AND METHOD FOR PASSIVE COMMUNICATION SERVICES

CROSS REFERENCE TO RELATED APPLICATIONS

This application claims the benefit of priority to previously filed U.S. Provisional Patent Application No. 61/491,296 entitled "SYSTEM AND METHOD FOR PASSIVE COMMUNICATION SERVICES" and filed on May 30, 2011, the contents of which are incorporated herein by reference.

TECHNICAL FIELD

The present disclosure generally relates to a system and method of providing passive presence and conversation services between users on a communication network.

BACKGROUND

Presence and conversation are two important communication services in both the public internet and the telecom networks. The majority of the existing Presence and Conversation services create significant traffic flows in the network, using IP Multimedia Subsystem (IMS), Session Initiation Protocol (SIP) or other session-based protocol. Extra system capacity is required to handle these overhead network traffics, which increases the overall cost to deploy IMS-based presence or conversation service in the operator network.

Representational State Transfer (REST) is a style of software architecture consisting of clients initiating requests to servers, servers processing the requests, and returning appropriate responses. Requests and responses are built around the transfer of representations of resources. A representation of a resource is typically a message or a document that captures the current state of a resource. At any particular time, a client can either be waiting for a response to an outstanding request or "at rest". A client in a rest state is able to interact with its user, but creates no load and consumes no per-client storage on the servers or on the network. No session state or client context is stored on the server between requests. An architecture which conforms to REST constraints is referred to as being RESTful.

At present, there is no mechanism supported by open standards bodies in the communication network space that provides for a lightweight, stateless presence and conversation service.

Accordingly, it should be readily appreciated that it would be advantageous to have a solution for reducing the network traffic flows generated and network resources utilized by the presence and conversation services by using a passive approach.

SUMMARY

It is an object of the present invention to obviate or mitigate at least one disadvantage of the prior art.

Disclosed herein is a Presence and Conversation Service that is built using a RESTful approach, requiring a minimum amount of network traffic and resources.

In a first aspect of the present invention there is provided a method for initializing a conversation service between users in a communication network, comprising the steps of: receiving, from a first user device, a request to initiate a conversation with a second user device; identifying a conversation object associated with the received request; sending an invitation, including an identifier associated with the conversation object, to the second user device; and receiving a listen request for notification of updates to the conversation object from the first user device. The step of identifying the conversation object can include determining if a conversation object exists associated with the first user and the second user. In response to the conversation object not existing, a conversation object can be created, associated with the first user and the second user. The identifier associated with the conversation object can be sent to the first user device. The invitation can be an SMS-0 message. The method can further comprise the step of sending a conversation history associated with the conversation object to at least one of the first user device or the second user device. The method can further comprise the step of transmitting a reply to the received listen request, to the first user device, in response to receipt of a conversation update from the second user device.

In a second aspect of the present invention there is provided a method for updating a conversation between users in a communication network, comprising the steps of: receiving a listen request for notification of updates to a conversation object from a first user; receiving a message, associated with the conversation object, from a second user; updating the conversation object, in accordance with the received message; and transmitting a reply to the received listen request, to the first user, in response to updating the conversation object. The reply to the received listen request can include the message received from the second user. The method can further comprise the step of receiving a listen request for notification of updates to the conversation object from the second user device. A reply to the listen request received from the second user device can be transmitted, acknowledging the update of the conversation object in accordance with the received message. The step of updating the conversation object can include storing the received message in a conversation history associated with the conversation object. The method can further comprise the step of receiving an updated listen request for notification of updates to the conversation object from the first user device, in response to transmitting the reply. The received listen request can be a long poll request message.

In another aspect of the present invention there is provided a conversation system comprising: a memory for storing a conversation object associated with a first user and a second user; a communication interface for receiving, from the first user, a request to initiate a conversation with the second user; and for receiving a listen request for notification of updates to the conversation object from the first user; and a processor for identifying the conversation object associated with the received request; for instructing the communication interface to transmit an invitation indicating the identified conversation object to the second user; and for transmitting a reply to the received listen request in response to receipt of a conversation update from the second user. The processor can determine if a conversation object is stored in the memory associated with the first user and the second user. The processor can create a conversation object in the memory associated with the first user and the second user, in response to the conversation object not existing. The communication interface can receive a message from the second user and, in response to receiving the message, the processor can update the conversation object. The reply to the received listen request can include the conversation update. The received listen request can be a long poll request message.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
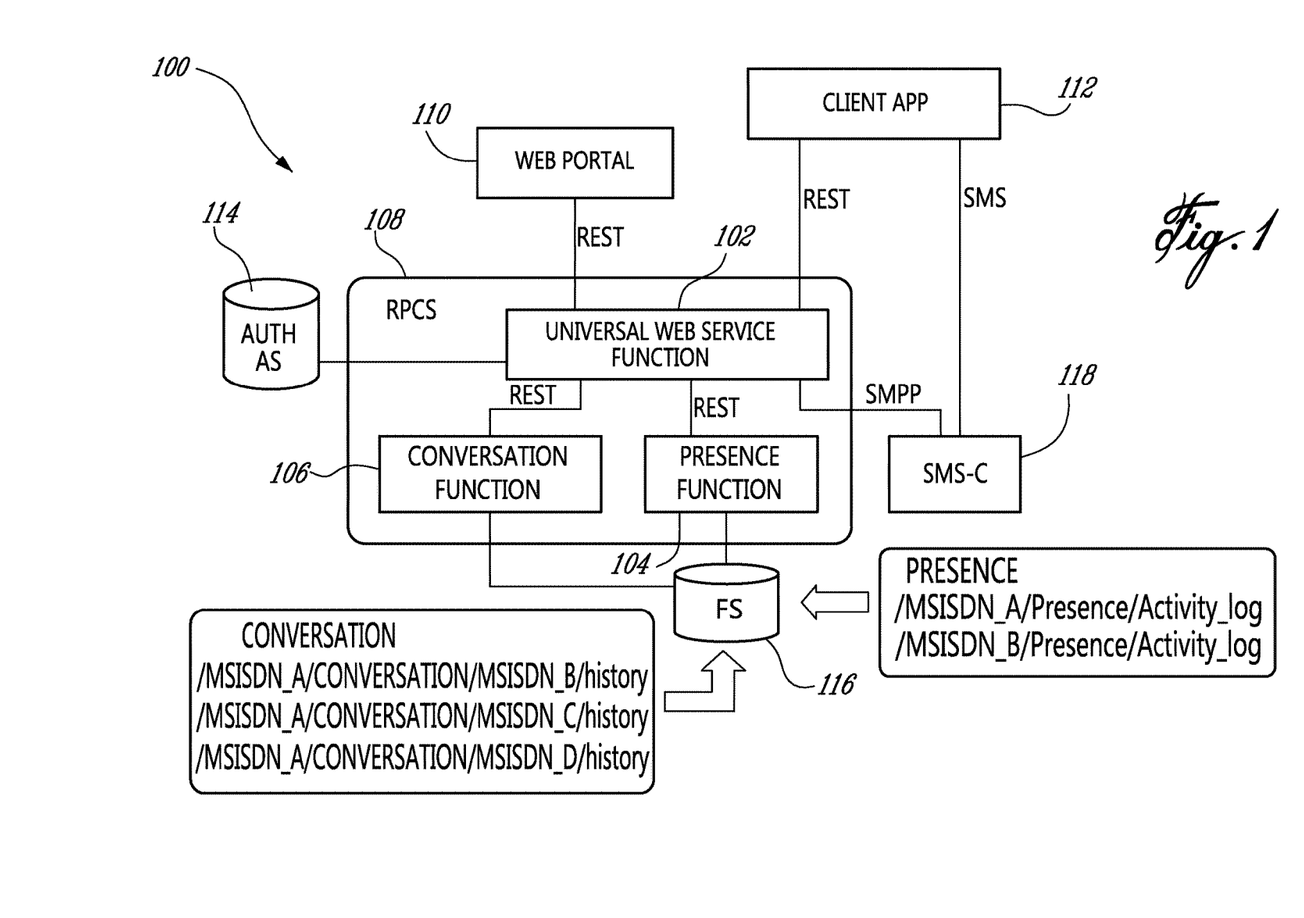
FIG. 1 is an architecture view illustrating a REST based Presence and Conversation Service.

Referring now to FIG. 1, the proposed service contains three main functions: a Universal Webservice Function (UWF) 102, a Presence Function (PF) 104, and a Conversation Function (CF) 106. The UWF 102, PF 104 and CF 106 can reside on a single node, such as the REST based Presence and Conversation Service (RPCS) 108, in a communication network 100 or can be distributed over multiple nodes in the network. Each function can be a framework consisting of one or more software modules or application code executed by hardware.

The UWF 102 is an API container binding to the lower level telecommunications functions such as registration for service, profile management, etc. The UWF 102 provides the REST API towards the web portal 110 and client applications 112. It can also provide authentication and authorization for the clients who make the service requests by accessing the Authentication and Authorization Application Server (AUTH AS) 114.

The PF 104 performs a proxy role to update and record the activities performed by the client applications 112 in the File System (FS) 116 on a per subscriber basis. It can also allow a client to retrieve a history of past activities. The PF 104 has logic to determine the presence status of a user based upon his activity history, and a set of rules or policies as set by the operator or a client.

The CF 106 provides the information associated with a conversation for the participating users. It exchanges the information among all the participants/users/user devices involved in the conversation. It can also index and store the messages exchanged during a conversation in the file system 116. It provides a means to allow the user to retrieve and view the conversation history.

The REST based presence and conversation services provide the mechanism to allow authentication and authorization to be done via a 3PP authentication application server. The Short Message Service Center (SMS-C) 118 can be used to send an SMS notification for a conversation invitation. The FS 116 can be a central data repository for the network used to store the information related to conversations and presence for each user subscribed to the network.

Those skilled in the art will appreciate that the present disclosure refers to users and participants interchangeably for clarity and readability. It will be appreciated that messages are sent and received by the user devices associated with the users.

Figure 2:
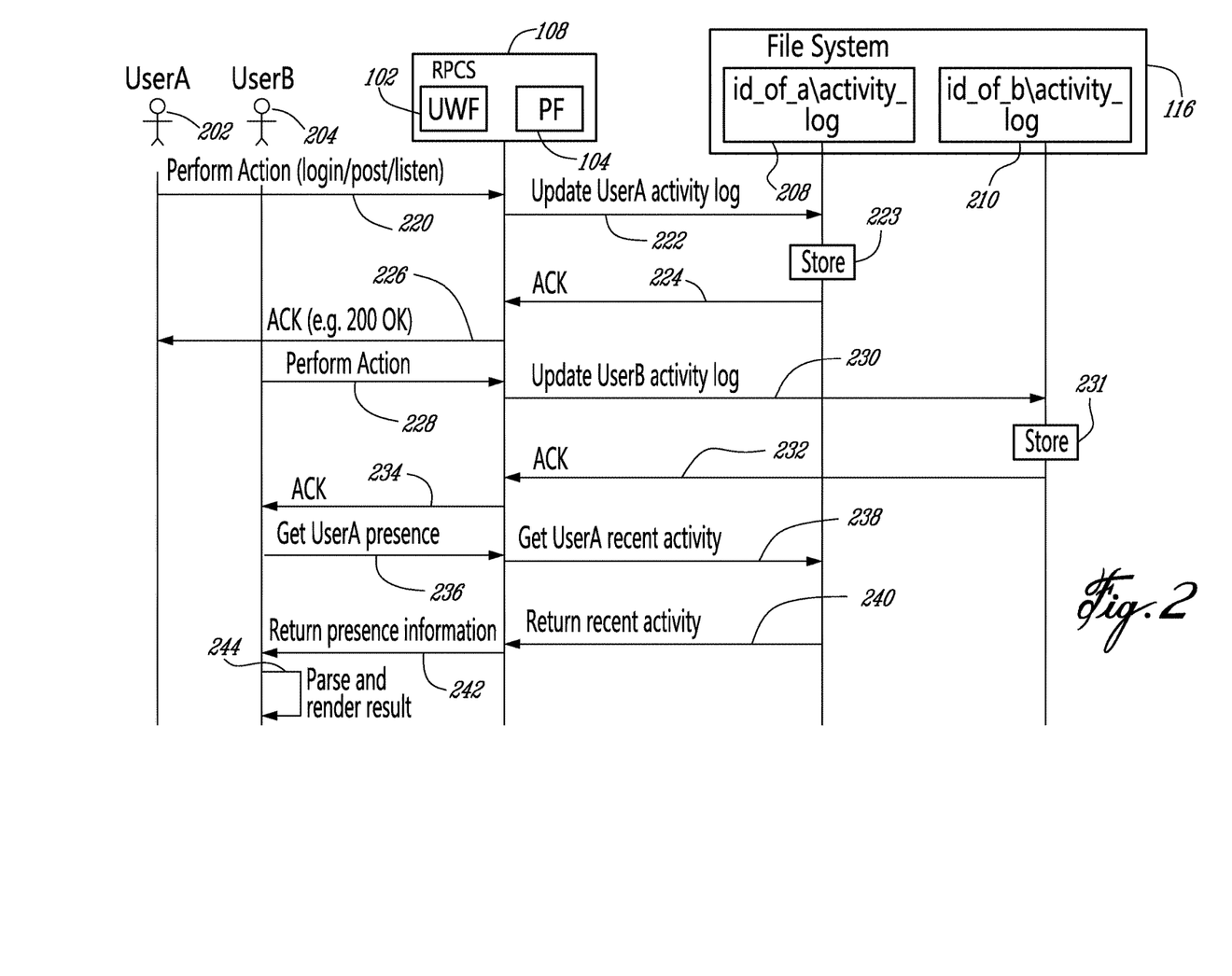
FIG. 2 is a call flow illustrating an example presence service.

An example embodiment of the call flow for the presence service of the present invention is shown in FIG. 2. Those skilled in the art will appreciate that this example involves the UWF 102 and PF 104 of the RPCS 108, however the specific details related to communications and interactions between the UWF 102 and the PF 104 will be omitted for simplicity. User A 202 performs an action 220 (e.g. login, post a message, listen, etc) on their mobile device on the network via the UWF 102. After receiving the request 220 from User A, the UWF 102 identifies the type of action and instructs the PF 104 to log this action for the subscriber User A. The PF 104 sends instruction 222 to update the activity in the log file 208 stored in the FS 116 for User A by following a path such as /MSISDN_A/Presence/Activity_Log. The log file can contain a list of action types with associated date, time, and any other appropriate data fields. Each subscriber on the network can have its own associated activity log file. The operator can configure which type of actions are recorded and stored in the log files. The FS 116 stores the update in User A's activity log 208 in step 223. The FS 116 responds with an acknowledgement message ACK 224 to the RPCS 108 which in turn, sends ACK 226 to User A. ACK 226 can be a Hyper Text Transfer Protocol (HTTP) 200 OK message or a SIP message or any other acknowledgement message in a suitable protocol. HTTP messages will be used only for exemplary purposes. Those skilled in the art will appreciate that acknowledge messages 224 and 226 can be optional depending on the specific implementation and protocol details.

Similarly, User B 204 also performs an action 228 (e.g. login, post a message, listen, etc) on their mobile device via the UWF 102. After receiving the request from User B, the UWF 102 identifies the action type and instructs the PF 104 to log this action for the subscriber User B. The PF 104 sends instruction 230 to update the activity in the log file 210 stored in the FS 116 for User B by following the exemplary path /MSISDN_B/Presence/Activity_Log. The update is stored in step 231, and optional acknowledgment messages 232 and 234 can be returned similar to messages 224 and 226 as described above.

User B may wish to inquire about, to or follow, the presence information of User A within the network. User A can be a contact in User B's address book. The client application in User B's mobile device can send a request 236 to the UWF 102 to retrieve User A's presence status. The UWF 102 forwards the request to the PF 104 to retrieve User A's activity log file. The PF 104 requests User A's activity 238 from the FS 116, and the information is returned in message 240. After retrieving User A's activity log file, the PF 104 derives the presence status of User A based upon criteria defined by either the operator and/or the end users. The PF 104 may use the type of action, time of an action or any other criteria to determine a presence status from the information stored in the activity log file. The presence status of a user in the network may be one of online, offline, busy, available, etc or any other status as defined by the operator or a subscriber. The presence status can be determined based on interpreting only the most recent logged action or any number of logged actions. For example, the PF 104 can read User A's activity log and determine that User A was active within a recent predetermined time period and assume that User A is "online" as his estimated status.

The PF 104 then returns the presence status of User A to the UWF 102. The UWF 102, in turn, sends the presence information 242 of User A to the device of User B. The device may render 244 this information to User B as shown in FIG. 3.

Those skilled in the art will appreciate that the RESTful presence service described provides a stateless and passive presence status for a user. The status of a user is only determined when another user requests the information. This method does not require the network overhead for establishing, maintaining and eventually tearing down a session, nor does it require the continually network traffic needed to maintain an active presence status for a user.

Figure 3:
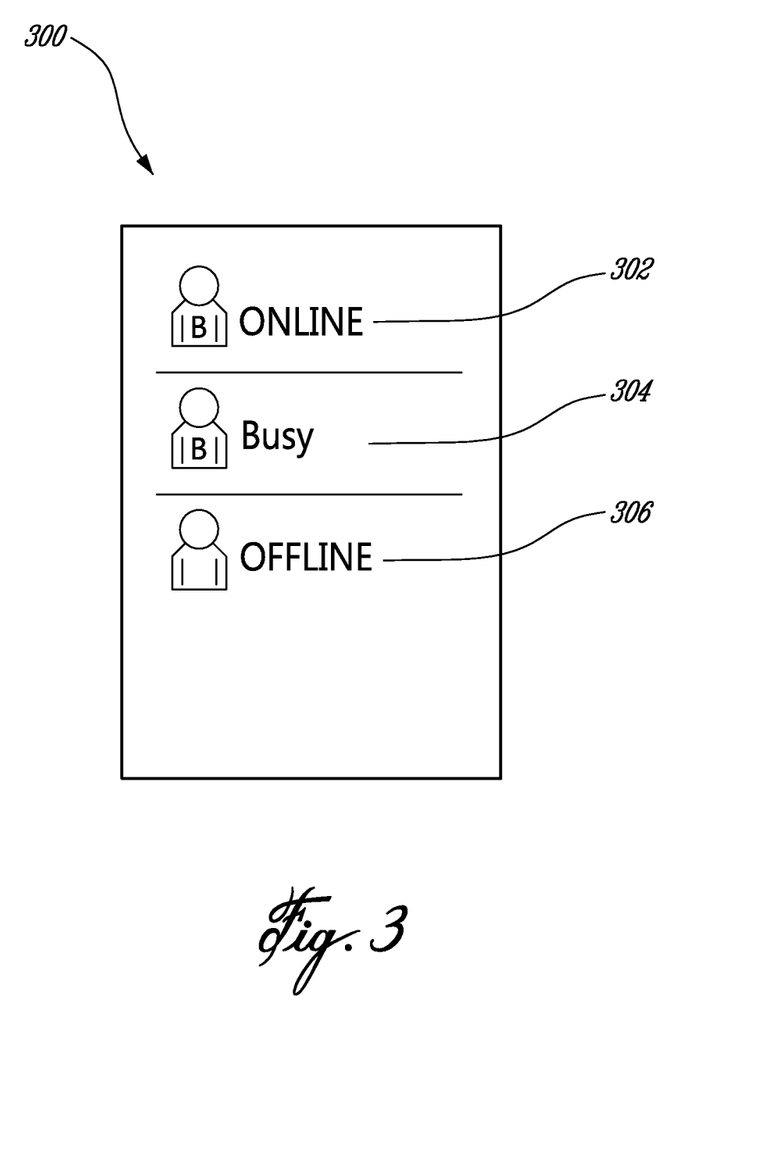
FIG. 3 is an example of a presence status displayed on a mobile device.

FIG. 3 illustrates an example display of a user's mobile device 300 displaying a presence status as determined in FIG. 2. Examples of various presence statuses for a user are "online" 302, "busy" 304 or "offline" 306.

Figure 4:
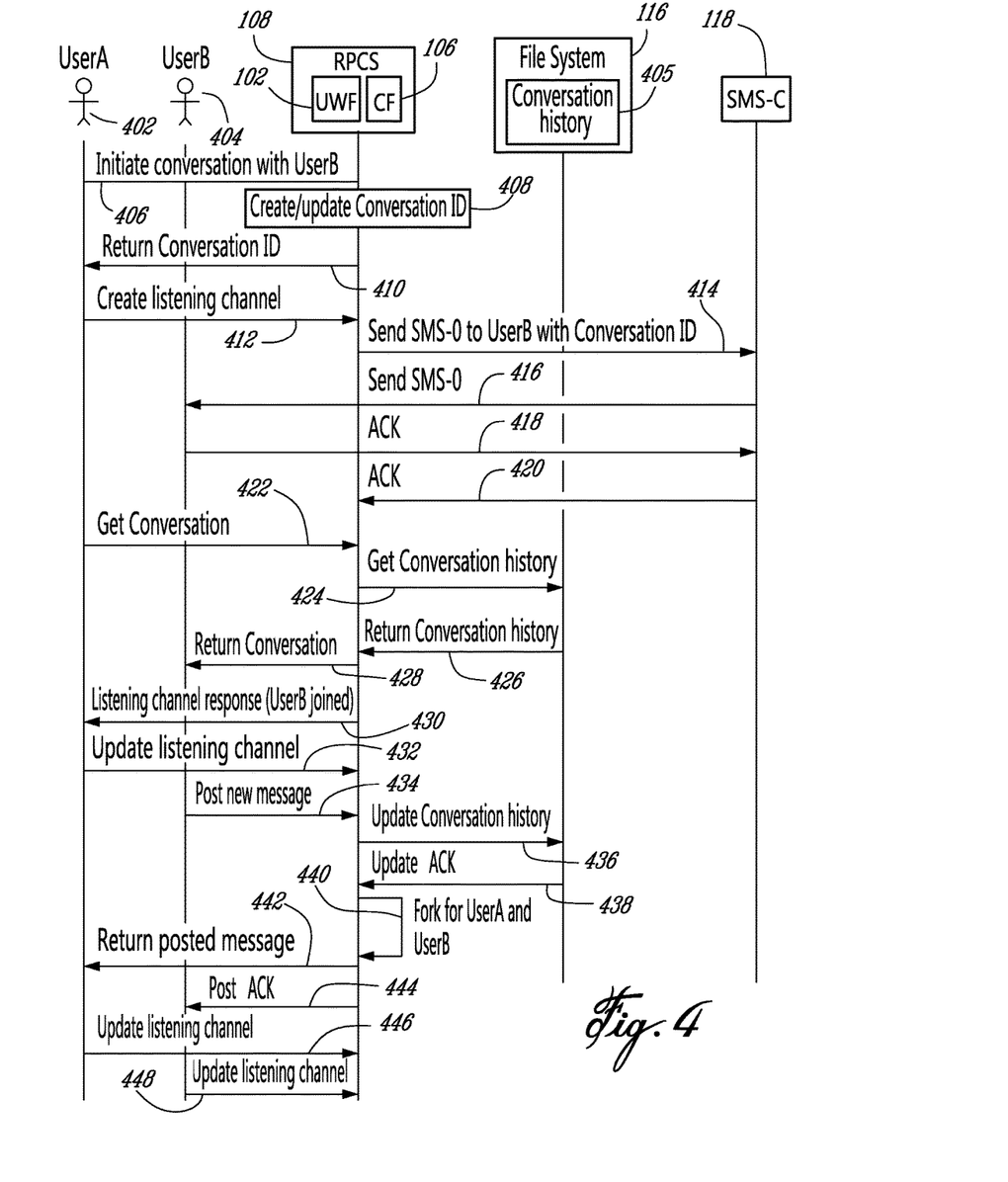
FIG. 4 is a call flow illustrating an example conversation service.

An example embodiment of the call flow for the conversation service of the present invention is shown in FIG. 4. Those skilled in the art will appreciate that this example involves the UWF 102 and CF 106 of the RPCS 108, however the specific details related to communications and interactions between the UWF 102 and the CF 106 will be omitted for simplicity. User A 402 can select User B 404 from his contact list on his mobile device and send a conversation invitation message 406 to User B via the UWF 102. Invitation 406 can be an HTTP POST or any other appropriate message. After receiving the invitation 406 from User A, the UWF 102 instructs the CF 106 to identify a conversation object (or resource).

A conversation object can be a data object or an entry stored in the FS 116 or a central data repository in the network. Each conversation object can have a unique identifier (ID), a list of the participants (i.e. User A and User B) associated with the conversation, and a conversation history 405. Participants can be identified by name, Mobile Subscriber Integrated Services Digital Network Number (MSISDN) or any other public identity unique to the subscriber. The conversation history 405 can be a file storing all previous messages exchanged between the participants associated with the conversation object. The conversation object may include the conversation history or it may be a pointer to the conversation history which is stored elsewhere in the network.

In step 408, the CF 106 determines if a conversation object and conversation ID already exist for a previous conversation between the participants. If no conversation object exists, the CF 106 will create a new conversation object and associated conversation ID.

The UWF 102 receives the conversation ID for the generated or existing conversation object. The UWF 102 then forwards the conversation ID to the device of User A in message 410. Message 410 can contain an application identifier to trigger the chat client application in User A's device. The chat client can then create a listening channel for the conversation object using a Long Poll mechanism, by sending message 412 to the RPCS 108.

Long polling is a polling technique which allows emulation of an information push from a server to a client. With long polling, the client requests information from the server in a similar way to a normal poll. However, if the server does not have any information available for the client, instead of sending an empty response, the server holds the request and waits for some information to be available. Once the information becomes available (or after a suitable timeout), a complete response is sent to the client. The client will normally then immediately re-request information from the server, so that the server will almost always have an available waiting request that it can use to deliver updated data in response to an event.

The UWF 102 also sends an instruction 414 to send an SMS-0 message including the conversation ID to the device of User B via the Short Message Service Center (SMS-C) 118. The SMS-C 118 sends SMS-0 416 to User B, acknowledgement 418 is returned to SMS-C 118 and acknowledgement 420 is returned to UWF 102 to confirm delivery of the SMS-0 416. This SMS-0 416 is used as both the trigger to start the chat client application and a pointer to the conversation object to listen to. It will be appreciated that use of an SMS-0 message is one example method to notify the device of User B. Other possible methods include using a Multimedia Messaging Service (MMS) message, an email, or a SIP message. The chat client application in User B's device will then send a request 422 to the UWF 102 and the CF 106 to retrieve the conversation object identified by the received conversation ID. The RPCS 108 can retrieve any conversation history that may exist related to the conversation object from the FS 116 with request 424 and return 426. The RPCS 108 can forward 428 the conversation history to User B. The UWF 102 can indicate to User A that User B has joined the conversation via the response 430 sent in the listening channel. User A's device updates 432 the listening channel by Long Poll or other suitable mechanism.

User B posts a new message 434 to User A via the UWF 102. The UWF 102 passes the message to the CF 106 to store in the conversation object in the FS 116. CF 106 sends the update 436 to the FS 116 and receives an update ACK 438 in return. The UWF 102 does a fork 440 on the acknowledge message for the message posted by User B. User A receives the message posted by User B (i.e. the update to the conversation object) as a return 442 for its continuing long polling of the conversation object. User B receives an acknowledgement 444 for posting the message 434.

Note that in the case of a group conversation with more than two participants, the fork operation 440 can be performed to send the message posted by User B to all the other group members. For example, User C (not shown) can receive the message posted by User B, similar to return 442, as a response for its continuing long polling of the conversation object.

After receiving messages 442 and 444, both User A and User B must update their long listening channels. The receipt of message 442 triggers the chat client application on the device of User A to update the listening channel via Long Poll 446. The receipt of message 444 triggers the chat client application on the device of User B to update the listening channel via Long Poll 448.

Figure 5:
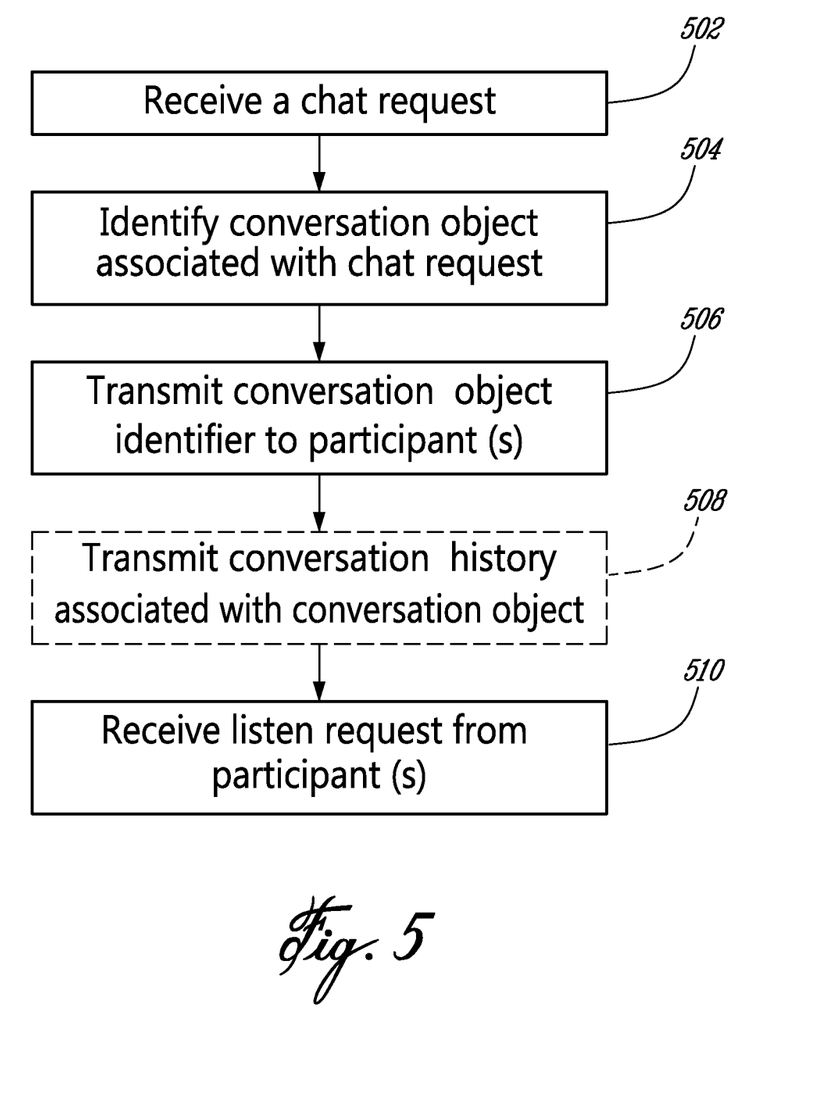
FIG. 5 is a flow chart illustrating a method for initializing a conversation service.

The devices of User A and User B can continue to long poll the conversation object as long as their respective chat client applications are running. Whenever new information is added to the conversation object, it will be returned to the users. When a user closes his chat client application, the client device will simply stop listening to the conversation object. Other participants can receive an update that a user has left (i.e. has stopped listening to) the conversation FIG. 5 is a flow chart illustrating a method for initializing a conversation service according to an embodiment of the present invention. The method can be implemented by a node in a communication network such the RPCS 108 of FIG. 1 or can be implemented by a number of nodes or modules in the network. In step 502, a chat request is received from a first user device. The chat request can identify a second user or a plurality of users requested to participate in the chat/conversation with the first user. A conversation object is identified in accordance with the received chat request in step 504. The conversation object can be identified by the identities of the first user and the requested participant(s) in the chat request. Step 504 can include determining if a conversation object related to the chat request already exists. If a conversation object does not exist, a new object can be created. In step 506, a conversation object identifier is transmitted to the conversation participants. The conversation object identifier can be included in a reply to the chat request sent to the first user device. The conversation object identifier can be included in a chat invitation message sent to the requested participants. The invitation and conversation object identifier can be transmitted by an SMS-0 message or by other means. In step 508, a conversation history can optionally be transmitted to each of the user devices, if any history exists. The conversation history can include any messages previously exchanged between the participants and optionally, the presence status for each participant. In step 510, a listen request to listen to the conversation object for updates is received from each user device which is active in the conversation. The listen request can be a long poll request message. The listen request can be a request to receive notification of updates to the conversation object.

Figure 6:
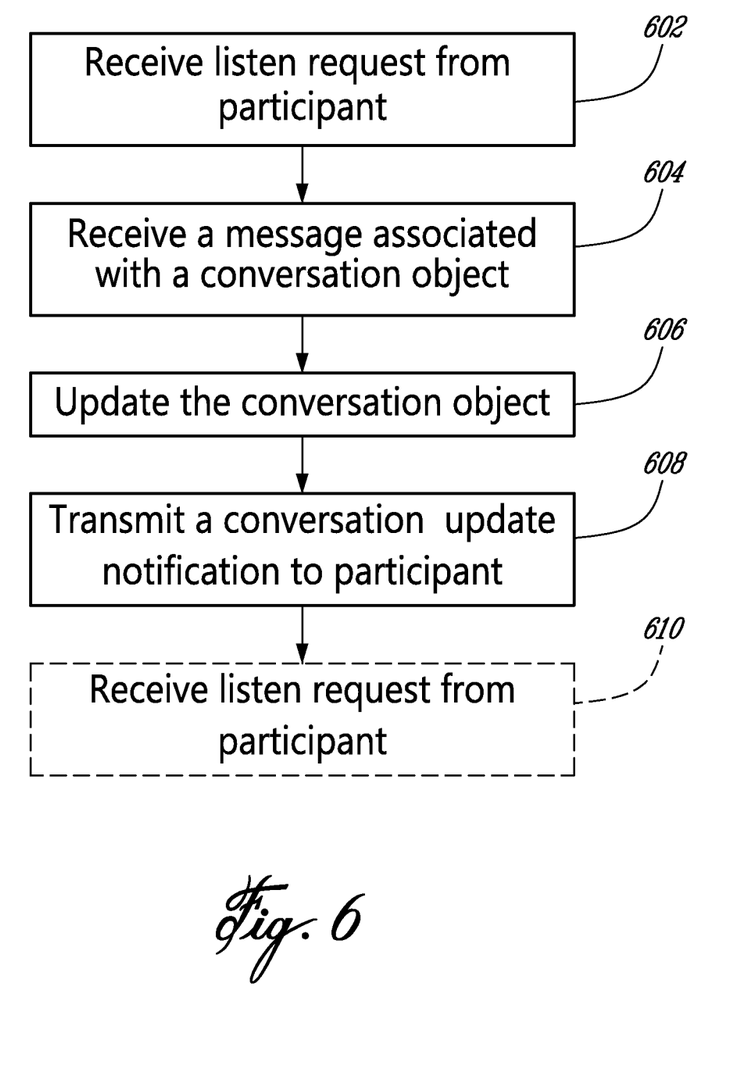
FIG. 6 is a flow chart illustrating a method for updating a conversation service.

FIG. 6 is a flow chart illustrating a method for updating a conversation service according to an embodiment of the present invention. In step 602, a listen request to create a listening channel for updates to a conversation object is received from the device of at least one participant associated with the conversation object. The listen request can be a long poll request message. A message is received in step 604 from a first participant device to update the conversation object. The conversation object is updated in accordance with the received message in step 606. Updating the conversation update can include saving or storing the received message in the conversation history. In step 608, a conversation update notification is transmitted to each of the participants as a reply to the listen requests received in step 602 and in response to updating the conversation object 606. The conversation update notification can be an acknowledgement to a first participant that his message 604 has been posted to the conversation object. The conversation update notification can be a forwarding of the message received from the first participant to any other participants. The conversation update notification can be a link to retrieve any content posted to the conversation object since a previous update for a participant. In step 610, new listen requests can optionally be received from some or all of the participant devices in the conversation.

Figure 7:
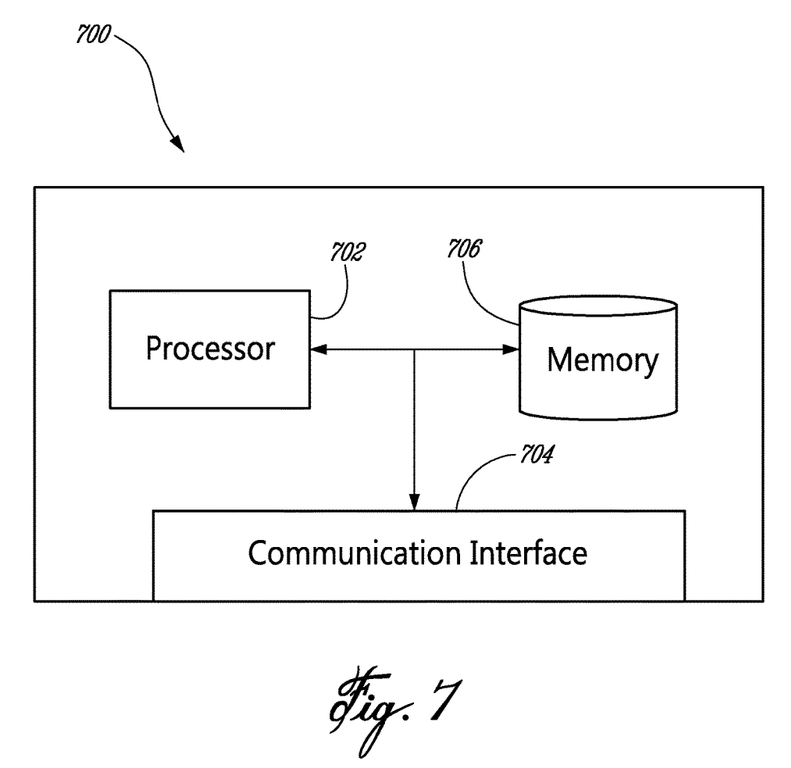
FIG. 7 is a block diagram illustrating an example node of the present invention.

FIG. 7 is a block diagram illustrating an example node 700 that can implement any of the various embodiments of the present disclosure. Node 700 includes a processor 702, a communication interface 704 and a memory 706. The memory 706 can store instructions, which when executed by the processor 702, allow the node 700 to perform the functions of the RPCS 108 of FIG. 1, including the Universal Web Service Function 102, the Presence Function 104 and the Conversation Function 106. The memory 706 can also store a conversation object associated with a conversation between at least two participants. The communication interface 704 receives, from a user device, a request to initiate a conversation with a second user device. The communication interface 704 also receives, from the first user device, a listen request to listen to the conversation object for updates and to receive a notification upon an update.

The processor 702 identifies the conversation object associated with the received request. Identifying the conversation object can include determining if a conversation object already exists, stored in memory 706, associated with the first and second users. If such a conversation object does not exist, the processor 702 creates a new conversation object in the memory 706. The processor 702 instructs the communication interface 704 to transmit a conversation invitation to the second user, the invitation indicating the identified conversation object. The invitation can include a conversation ID. The processor 702 can optionally instruct the communication interface 704 to transmit a conversation history, associated with the conversation object, to one or both of the users. The conversation history may be accessed and retrieved from the memory 706, or alternatively, it may be stored in a data repository located elsewhere in the communication network.

The communication interface 704 receives a new message from the second user device. The processor 702 updates the conversation object in response to the received new message and instructs the communication interface 704 to transmit a reply to the received listen request, from the first user device, in response to receipt of a conversation update from the second user device. The reply to the received listen request sent to the first user device can include the new message received from the second user device. The communication interface 704 can also transmit an acknowledgement to the second user device to confirm that his message has been received and the conversation object has been updated. The communication interface can receive, from the first user device, an updated listen request for notification of updates to the conversation object.

The REST-based presence and conversation services of the present disclosure do not rely on any heavy infrastructure, set-up, or network overhead. It does not require users to register or subscribe for conversations or presence information. The present disclosure uses a passive or assumed presence state based on logged activities rather than an absolute state. This solution does not require the use of a SIP stack or any IMS infrastructure, only a REST-based client implementing the HTTP based API. The solution is stateless as there are no active sessions once a conversation is ended. In the present disclosure, the chat client application on the user device is in charge of the conversations, and invitations are controlled via SMS, for example. As opposed to closing an active session, the client can simply stop listening to the conversation object.

Based upon the foregoing, it should now be apparent to those of ordinary skill in the art that the present disclosure provides an advantageous solution. Although the system and method of the present disclosure have been described with particular reference to certain type of messages and nodes, it should be realized upon reference hereto that the innovative teachings contained herein are not necessarily limited thereto and may be implemented advantageously in various manners. It is believed that the operation and construction of the present disclosure will be apparent from the foregoing description.

Embodiments of the invention may be represented as a software product stored in a non-transitory machine-readable medium (also referred to as a computer-readable medium, a processor-readable medium, or a computer-usable medium having a computer-readable program code embodied therein). The machine-readable medium may be any suitable tangible medium including a magnetic, optical, or electrical storage medium including a diskette, compact disk read only memory (CD-ROM), digital versatile disc read only memory (DVD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those skilled in the art without departing from the scope of the invention, which is defined by the claims appended hereto.

What is claimed is:

1. A method for initializing a conversation service between users in a communication network, for execution by a conversation service node, comprising:
    receiving, at the conversation service node, from a first user device, a request to initiate a conversation with a second user device;
    identifying a conversation object uniquely associated with the first user and the second user;
    sending an invitation, including an identifier associated with the conversation object, to the second user device;
    sending the identifier associated with the conversation object to the first user device without waiting for a reply from the second user; and
    receiving, at the conversation service node, a listen request for notification of updates to the conversation object from the first user device.

2. The method of claim 1, wherein the step of identifying the conversation object includes determining if a conversation object exists which is uniquely associated with the first user and the second user.

3. The method of claim 2, further comprising the step of creating a conversation object uniquely associated with the first user and the second user, in response to the conversation object not existing.

4. The method claim 1, wherein the invitation is an SMS-0 message.

5. The method claim 1, further comprising the step of sending a conversation history associated with the conversation object to at least one of the first user device or the second user device.

6. The method claim 1, further comprising the step of:
    transmitting a reply to the received listen request in response to receipt of a conversation update from the second user.

7. The method of claim 1, further comprising the steps of:
    receiving a message, associated with the conversation object, from a second user device;
    updating the conversation object, in accordance with the received message; and
    transmitting a reply to the received listen request, to the first user device, in response to updating the conversation object.

8. The method of claim 7, wherein the reply to the received listen request includes the message received from the second user device.

9. The method of claim 7, further comprising the step of receiving a listen request for notification of updates to the conversation object from the second user device.

10. The method of claim 9, further comprising the step of transmitting a reply to the listen request received from the second user device acknowledging the update of the conversation object in accordance with the received message.

11. The method of claim 7, wherein the step of updating the conversation object includes storing the received message in a conversation history associated with the conversation object.

12. The method of claim 7, further comprising the step of receiving an updated listen request for notification of updates to the conversation object from the first user device, in response to transmitting the reply.

13. The method of claim 7, wherein the received listen request is a long poll request message.

14. A conversation service node comprising:
    a memory for storing a conversation object uniquely associated with a first user and a second user;
    a communication interface for receiving, from the first user, a request to initiate a conversation with the second user and a listen request for notification of updates to the conversation object; and
    a processor for identifying the conversation object associated with the received request; for instructing the communication interface to transmit an invitation indicating the identified conversation object to the second user; for instructing the communication interface to transmit the identifier associated with the conversation object to the first user without waiting for a reply from the second user; and for transmitting a reply to the received listen request in response to receipt of a conversation update from the second user.

15. The conversation system of claim 14, wherein the processor determines if a conversation object is stored in the memory associated with the first user and the second user.

16. The conversation system of claim 15, wherein the processor creates a conversation object in the memory uniquely associated with the first user and the second user, in response to the conversation object not existing.

17. The conversation system of claim 14, wherein the communication interface receives a message from the second user and, in response to receiving the message, the processor updates the conversation object.

18. The conversation system of claim 14, wherein the reply to the received listen request includes the conversation update.

19. The conversation system of claim 14, wherein received listen request is a long poll request message.

* * * * *